US012115540B2

(12) United States Patent
Dunsmuir et al.

(10) Patent No.: US 12,115,540 B2
(45) Date of Patent: Oct. 15, 2024

(54) AIR SEALED BEARING FOR AN INDUSTRIAL CENTRIFUGE FOR CHEMICAL EXTRACTION

(71) Applicant: The Western States Machine Company, Fairfield, OH (US)

(72) Inventors: Edward D. Dunsmuir, Hamilton, OH (US); Steven Myers, Fairfield, OH (US); William Temple, Brookville, IN (US)

(73) Assignee: The Western States Machine Company, Fairfield, OH (US)

( * ) Notice: Subject to any disclaimer, the term of this patent is extended or adjusted under 35 U.S.C. 154(b) by 653 days.

(21) Appl. No.: 17/304,869

(22) Filed: Jun. 28, 2021

(65) Prior Publication Data

US 2022/0001397 A1 Jan. 6, 2022

Related U.S. Application Data

(60) Provisional application No. 63/046,787, filed on Jul. 1, 2020.

(51) Int. Cl.
*B04B 7/16* (2006.01)
*B04B 9/12* (2006.01)

(52) U.S. Cl.
CPC . *B04B 7/16* (2013.01); *B04B 9/12* (2013.01)

(58) Field of Classification Search
None
See application file for complete search history.

(56) References Cited

U.S. PATENT DOCUMENTS 2,145,633 A 1/1939 Roberts
3,175,689 A * 3/1965 Goodwin .................. B04B 9/06 210/365
4,229,298 A 10/1980 Bange
(Continued)

FOREIGN PATENT DOCUMENTS

JP H0538469 A 2/1993
WO 2018122945 A1 7/2018

OTHER PUBLICATIONS

International Search Report & Written Opinion to corresponding PCT Application No. PCT/US2021/039323 dated Oct. 25, 2021.

*Primary Examiner* — Peter Keyworth
(74) *Attorney, Agent, or Firm* — DINSMORE & SHOHL LLP

(57) ABSTRACT

An industrial centrifuge for extracting one or more compounds from biomass includes a centrifuge basket disposed within a cylindrical vessel. The centrifuge basket includes a cylindrical sidewall comprising an upper perforated portion and a lower solid portion and a basket baseplate coupled to the sidewall between the upper perforated portion and the lower solid portion. The centrifuge includes a spindle coupled to the basket baseplate, a spindle bearing assembly, and a contact seal disposed between the spindle bearing assembly and the basket baseplate. The lower solid portion of the sidewall, the spindle, and the basket baseplate define a skirted volume. During operation of the industrial centrifuge, air trapped within the skirted volume provides an air seal between an extraction fluid in the cylindrical vessel and the contact seal, spindle bearing assembly, or both, to prevent extraction fluid from contacting the spindle bearings and causing damage thereto.

15 Claims, 6 Drawing Sheets

(56) References Cited

U.S. PATENT DOCUMENTS

| | | | | | |
|---|---|---|---|---|---|
| 4,412,707 | A | * | 11/1983 | Buffet | B04B 9/12 494/83 |
| 5,254,241 | A | | 10/1993 | Bange et al. | |
| 5,897,786 | A | | 4/1999 | Henkel et al. | |
| 8,182,409 | B2 | | 5/2012 | Hoffmann | |

* cited by examiner

AIR SEALED BEARING FOR AN INDUSTRIAL CENTRIFUGE FOR CHEMICAL EXTRACTION

CROSS-REFERENCE TO RELATED APPLICATIONS

This application claims the benefit of priority of U.S. Provisional Application Ser. No. 63/046,787, filed on Jul. 1, 2020, entitled "Air Sealed Bearing for an Industrial Centrifuge for Chemical Extraction," the entire contents of which are incorporated by reference in the present disclosure.

TECHNICAL FIELD

The present disclosure is directed to industrial centrifuges, in particular, to industrial centrifuges used for chemical extraction processes.

BACKGROUND

Industrial centrifuges may be used to extract one or more chemicals from a mixture of botanical (plant) matter. In one botanical product extraction application, an industrial centrifuge can be used in a cold chemical extraction of cannabidiol (CBD) oil droplets from biomass comprised of industrial hemp or certain low-THC strains of marijuana. Typically, cold chemical extraction is conducted at low temperatures, such as around −40° F., in the presence of an extraction fluid. The extraction fluid extracts the CBD oil droplets, which are carried by the extraction fluid and separated from the biomass by centrifugal force.

SUMMARY

Exposure of the various bearings of the industrial centrifuge to the extraction fluid may cause damage to the bearings or a motor of the industrial centrifuge. This disclosure relates to an air seal for a spindle bearing assembly of an industrial centrifuge to prevent the extraction fluid from leaking into the spindle bearing assembly, the motor bearing assembly, or both. Reducing or preventing exposure of the bearing assemblies to the extraction fluid may reduce or prevent damage to the spindle bearing assembly, the motor bearing assembly, the motor, or combinations of these. The air seal may further allow more cost effective bearings to be used in place of sealed bearings constructed of materials acceptable for use with extraction centrifuges operating with −40° F. cooled extraction fluids. The air seal may be passive, driven only by the gravitation force of the extraction fluid compressing the air trapped in a chamber containing the bearing assembly.

In one or more aspects of the present disclosure, a centrifuge basket for an industrial centrifuge for extracting compounds from biomass may include a sidewall comprising an upper perforated portion and a lower solid portion, where the sidewall is cylindrical and the lower solid portion does not include perforations. The centrifuge basket may further include a basket baseplate coupled to an inner surface of the sidewall between the upper perforated portion and the lower solid portion. The centrifuge basket may further include a spindle attachment assembly coupled to the basket baseplate. The lower solid portion of the sidewall, a bottommost surface of the basket baseplate, and a housing of the spindle attachment assembly may define a skirted volume operable to form an air seal between an extraction fluid and one or more bearings during operation of the industrial centrifuge.

In one or more other aspects of the present disclosure, an industrial centrifuge for extracting one or more compounds from biomass includes a centrifuge basket disposed within a cylindrical vessel. The centrifuge basket may include a sidewall that is cylindrical and comprises an upper perforated portion and a lower solid portion. The centrifuge basket may further include a basket baseplate coupled to an inner surface of the sidewall between the upper perforated portion and the lower solid portion. The industrial centrifuge may include a spindle coupled to the basket baseplate and operatively coupled to a drive mechanism operable to rotate the spindle about an axis. The industrial centrifuge may further include a spindle bearing assembly coupled to the cylindrical vessel and disposed between a bottom of the cylindrical vessel and the basket baseplate. The industrial centrifuge may further include a contact seal disposed between the spindle bearing assembly and the basket baseplate. The spindle may pass vertically through the spindle bearing assembly and may extend vertically downward to the drive mechanism disposed vertically below the bottom of the cylindrical vessel. The lower solid portion of the sidewall, the basket baseplate, and a portion of the spindle may define a skirted volume, and at least a portion of the spindle bearing assembly is disposed within the skirted volume. During operation of the industrial centrifuge, air trapped within the skirted volume may provide an air seal between an extraction fluid in the cylindrical vessel and the contact seal. The air seal may reduce or prevent exposure of the contact seal and portions of the spindle bearing assembly to extraction fluids contained in the cylindrical vessel during operation.

In one or more other aspects of the present disclosure, a vertical chemical extraction centrifuge may comprise a motor drive control, operator's controls and safety systems, a leak-proof cylindrical vessel containing a cylindrical centrifuge basket. The centrifuge basket may include a cylindrical basket having a partially perforated basket wall region extending above a sealed circumferential attachment to a solid centrifuge basket baseplate. The centrifuge basket may include a further extension of the basket wall region below the basket baseplate forming a solid cylindrical skirt extending below the centrifuge basket baseplate. The centrifuge basket baseplate may be attached to a rotating vertical spindle extending below the base plate. The industrial centrifuge may include a spindle bearing assembly attached to the cylindrical vessel. The rotating vertical spindle may be mounted in a spindle bearing assembly connected to a motor drive through the leak-proof cylindrical vessel. The solid cylindrical skirt extension may extend vertically below the spindle bearing assembly. When the cylindrical vessel is filled with extraction fluid, an air bubble may be formed in the skirt extension region underneath the basket baseplate. The air bubble may act as an air seal for the spindle bearing assembly protecting it from exposure to extraction fluid.

BRIEF DESCRIPTION OF THE FIGURES

The following detailed description of specific embodiments of the present disclosure can be best understood when read in conjunction with the following drawings, where like structure is indicated with like reference numerals and in which.

DESCRIPTION

Figure 1:
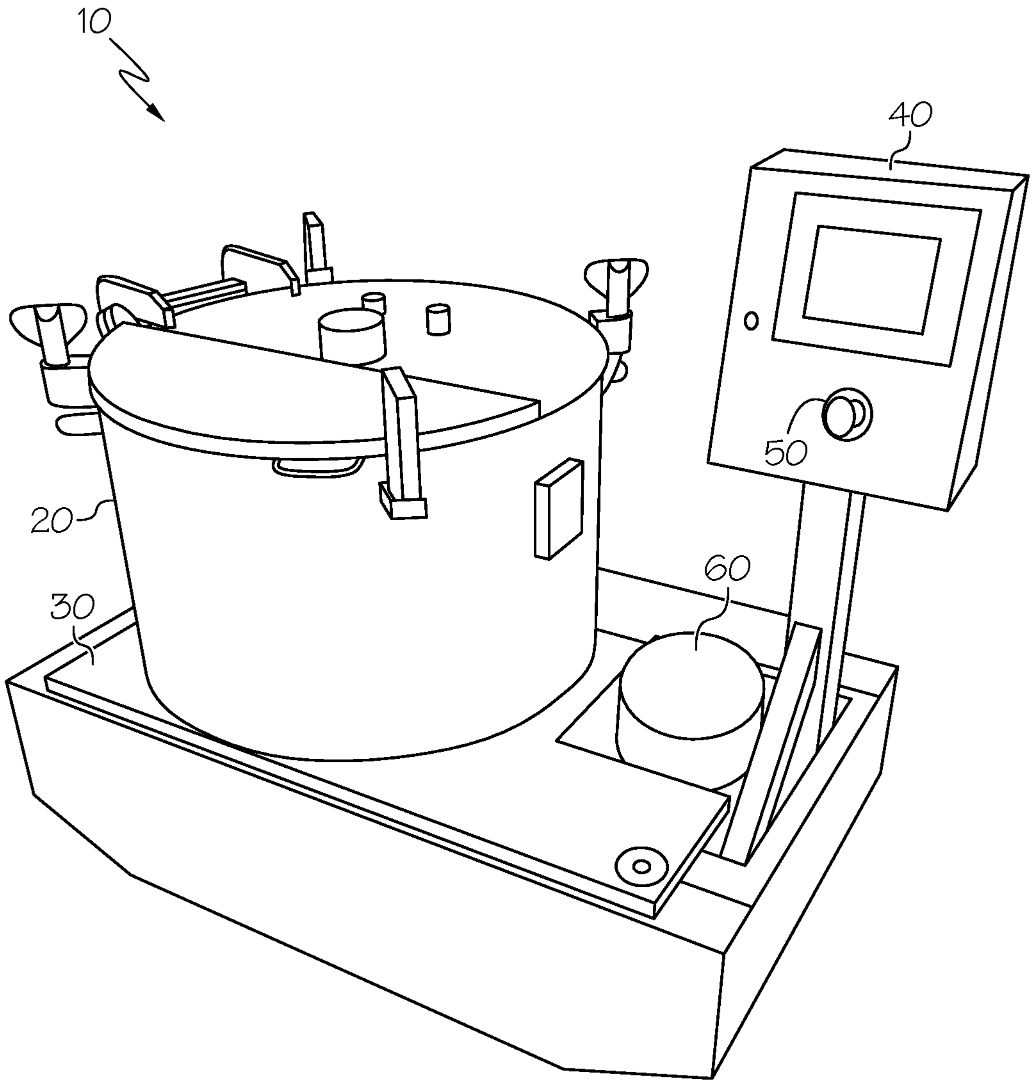
FIG. 1 schematically depicts a perspective view of an industrial extraction centrifuge, according to one or more embodiments shown and described herein.

The present application is directed to methods and seals for reducing or preventing damage to bearings of industrial centrifuges caused by exposure of spindle bearings, motor bearings, or both to the extraction fluid. In particular, the present disclosure is directed to industrial centrifuges having a centrifuge basket and spindle bearing assembly that create an air seal capable of preventing exposure of the spindle bearing, the motor bearing, or both to the extraction fluid, thereby, reducing the potential for damage to the spindle bearing, motor bearing, or both.

Sealing bearings, such as rotating shaft ball and roller bearings, against wet environments can be challenging. Three different types of ball bearings can be identified: open bearings (where the balls and ball races are exposed); shielded bearings; and sealed bearings. Open bearings, such as open ball bearings, are the most cost efficient bearings and are bearings in which the balls bearings and ball races are exposed, which may allow fluids, solid debris, or both to contact the balls and ball races. In the case of open bearings in an industrial extraction centrifuge, the balls and ball races are open to exposure to the extraction fluid, which can cause damage to the balls and ball races.

Shielded bearing can include one or more shields to protect the balls and ball races. Shields are metallic discs connected to the outer bearing race, with no contact between the shield bore and the bearing inner race. Shielded bearings may prevent solid debris and some liquids from penetrating into the bearing but do not completely prevent liquids from reaching the balls and ball races.

Sealed bearings may include one or more fluid seals, which may be constructed from various elastomeric materials and may be in contact with the shaft itself. The type of fluid seal material selected can depend on compatibility with environmental factors such as the fluid composition, viscosity, temperature, and fluid hydraulic pressure. Mechanical factors such as whether the shaft is sliding (as in a hydraulic cylinder) or rotating (as in a pump or centrifuge), and the shaft surface speed can also influence selection of the seal type.

Certain companies such as A.W. Chesterton of Groveland, Massachusetts specialize in rotating shaft sealing solutions, which are largely used in pumps and valves. Shaft seals range from simple elastomer lip seals to complex rotating face seal assemblies. Seals acceptable for use with extraction centrifuges operating with −40° F. cooled extraction fluids, such as alcohols or aliphatic solvents, are complicated. The primary technical problem is finding an elastomer that is still elastic at −40° F. (−40° C.) and is not degraded by exposure to organic solvents such as but not limited to ethanol, heptane, or other extraction fluid. Functional motor bearing seal assemblies for industrial centrifuges which are useable in contact with −40° F. cooled extraction fluids such as ethanol or heptane, therefore, cost many thousands of dollars.

The present disclosure is directed to an air seal for the spindle bearings of the spindle bearing assembly, the motor bearings, or both of an industrial centrifuge for cold solvent extraction. The air seal of the present disclosure can prevent contact between the rotating spindle, motor, and/or static spindle bearing seal and the extraction fluid, which can be −40° F. ethanol or heptane in a chemical extraction centrifuge. Other extraction fluids suitable for cold temperature extractions are also contemplated.

The air seal is created by forming an air bubble disposed between the seal surface and the extraction fluid interface. The air bubble may be formed under the centrifuge base plate, as will be described further in the present disclosure. In particular, the centrifuge base plate and a lower solid portion of a sidewall of the centrifuge basket may define a skirted volume that is airtight. The spindle bearing of the rotating spindle supporting the centrifuge basket may be arranged to always be within the air bubble formed within the skirted volume defined underneath the centrifuge baseplate. Only the air in the air bubble contacts the spindle bearing, motor bearings, or both. Thus, the air in the air bubble separates the spindle bearings, motor bearings, or both from the extraction fluid. The air seal may allow simpler, commercially available rotary non-fluid resistant bearing seals to be used, such as lip or face seals. These standard seals cost a small fraction of the price of custom fluid-resistant bearing seal assemblies usable in contact with −40° F. pure ethanol or heptane extraction fluids.

Figure 2:
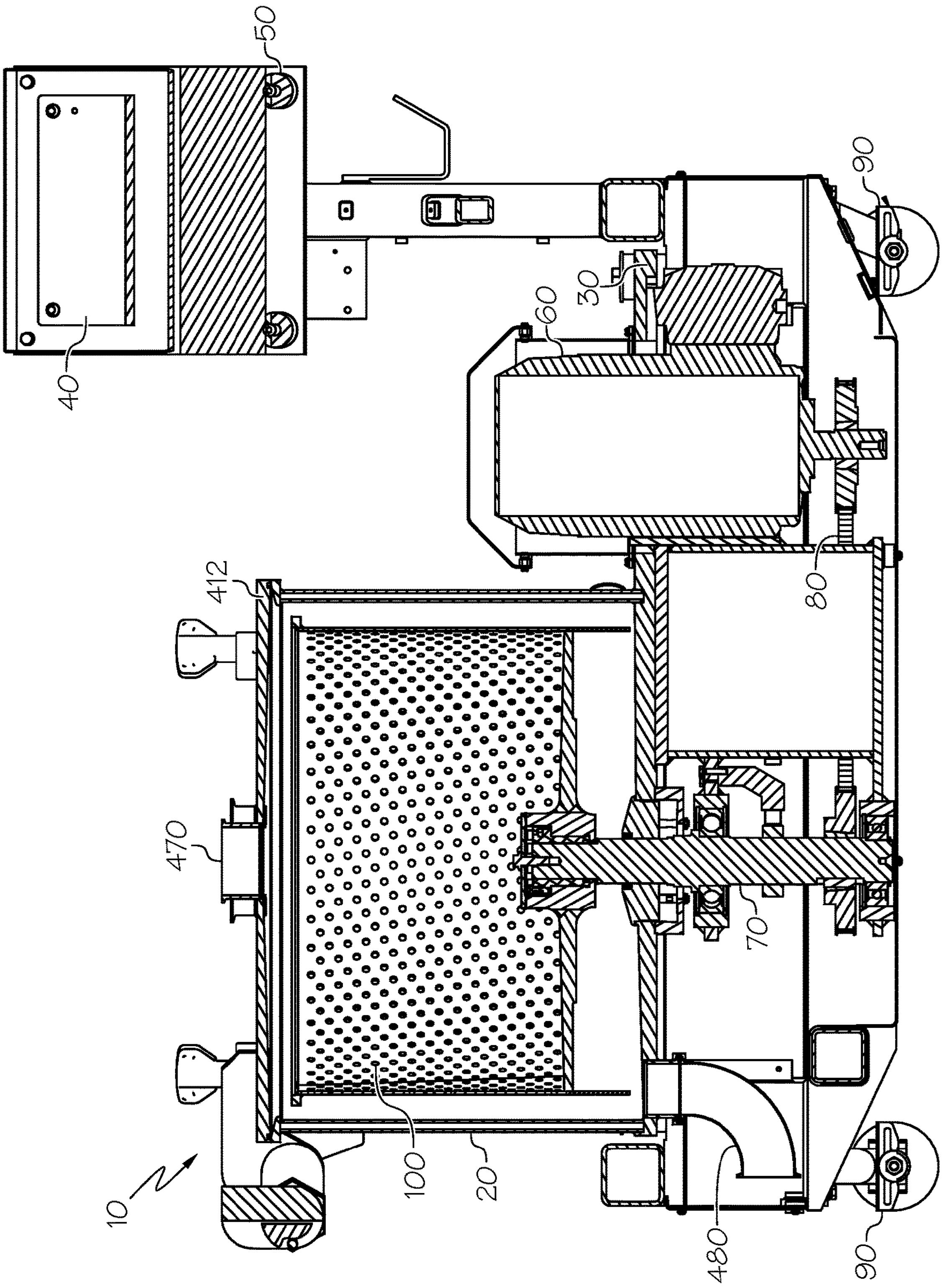
FIG. 2 schematically depicts a cross-sectional view of an industrial extraction centrifuge, according to one or more embodiments shown and described herein.

FIGS. 1 and 2 show an industrial centrifuge 10 for chemical extraction of the present disclosure. An example of the industrial centrifuge 10 for conducting chemical extractions may be a Western States Machine Company model C40 botanical extraction centrifuge designed and manufactured for OEM sale, although the industrial centrifuge 10 is not intended to be limited thereto. Referring to FIG. 1, the industrial centrifuge 10 includes a cylindrical vessel 20, which may be referred to as a curb. The cylindrical vessel 20 may be coupled to the machine floor 30. The machine floor 30 may form a bottom of the cylindrical vessel 20. In embodiments, the cylindrical vessel 20 may have a separate curb baseplate 430 (FIG. 6) coupled to the cylindrical vessel 20, where the curb baseplate 430 is then coupled to the machine floor 30. Referring to FIG. 2, the industrial centrifuge 10 may include a control panel 40, which may be communicatively coupled to a motor 60. Referring to FIG. 2, the cylindrical vessel 20 or curb may include a lid 412 that may be removable and sealable to the cylindrical vessel 20. The lid 412 may be removed to add biomaterial to the industrial centrifuge 10. The lid 412 may include one or more inlet pipes 470 that enable introduction of extraction fluids or other materials into the cylindrical vessel 20. The cylindrical vessel 20 may further include one or more outlet pipes 480 from which extraction fluids and extracted materials can be withdrawn from the cylindrical vessel 20.

Referring again to FIG. 2, the industrial centrifuge 10 includes a centrifuge basket 100 disposed within the cylindrical vessel 20. The centrifuge basket 100 may be a rotating cylindrical centrifuge basket in which chemical extraction from the rotating biomass takes place. The centrifuge basket 100 may be rotatable relative to the cylindrical vessel 20. The centrifuge basket 100 may be rigidly coupled to a spindle 70. The centrifuge basket 100 may be driven by the spindle 70, which may be connected by a timing belt 80 to an electric motor 60 disposed below the raised machine floor 30. Although shown as having a timing belt 80, it is understood that the electric motor 60 may be operatively coupled to the spindle 70 through other types of linkages. The industrial centrifuge 10 may include the control panel 40 for operation of the centrifuge 10 and emergency stop button 50, which are both located at the upper right in FIGS. 1 and 2. The industrial centrifuge 10 may further include castors 90 for easily moving the industrial centrifuge 10 between locations.

Figure 3:
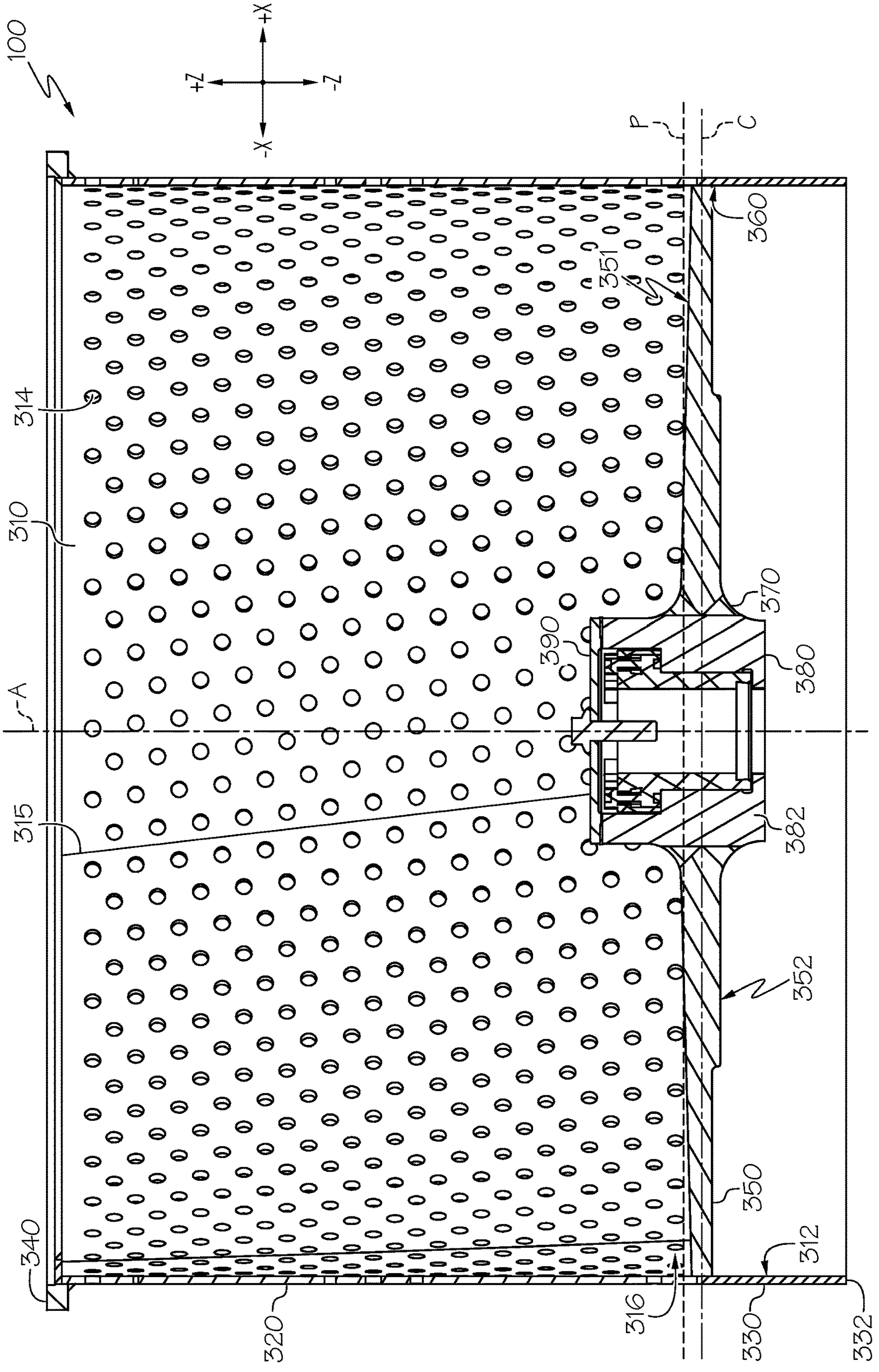
FIG. 3 schematically depicts a cross-sectional view of a centrifuge basket of the industrial extraction centrifuge of FIG. 1, the centrifuge basket comprising a spindle attachment assembly coupled to a basket baseplate, according to one or more embodiments shown and described herein.

Referring now to FIG. 3, a cross-sectional view of one embodiment of a centrifuge basket 100 is schematically depicted. The centrifuge basket 100 may include a sidewall 310, a reinforcing ring 340 coupled to the top of the sidewall 310, and the basket baseplate 350. The centrifuge basket 100 may further include a spindle attachment assembly 380 coupled to the basket baseplate 350 of the centrifuge basket 100. The sidewall 310 may be cylindrical and may be vertically with the center axis A of the cylindrical sidewall 310 parallel to the +/−Z direction of the coordinate axis in FIG. 3. The sidewall 310 may include an upper perforated portion 320 and a lower solid portion 330. The upper perforated portion 320 may have a plurality of perforations 314 spaced apart across the upper perforated portion 320. The lower solid portion 330 of the sidewall 310 may not have perforations. The upper perforated portion 320 and the lower solid portion 330 of the sidewall 310 of the centrifuge basket may be demarcated by a horizontal plane P (e.g., a plane perpendicular to the +/−Z direction of the coordinate axis in FIG. 3) that is tangent to a bottom of the perforations 314 the bottom most row 316 of perforations 314. The bottom most row 316 of perforations 314 may be the horizontal row of perforations 314 around the circumference of the centrifuge basket 100 that has a vertical position (e.g., position in the +/−Z direction of the coordinate axis in FIG. 3) lower than any of the other rows of perforations 314 (e.g., positioned in the −Z direction relative to all the other perforations 314).

The sidewall 310 of the centrifuge basket 100 may be formed by perforating a portion of a flat metal sheet to create the upper perforated portion 320. The partially perforated flat metal sheet may then be rolled into a cylindrical shape and the ends of the partially perforated metal sheet may then be welded together along a seam 315 to produce the sidewall 310 of the centrifuge basket 100 having a cylindrical shape. The top edge of the sidewall 310 may then be welded to the edges of the reinforcing ring 340.

The centrifuge basket 100 may further include a basket baseplate 350, which may be a disk-shaped plate. The basket baseplate 350 may be coupled/welded to the sidewall 310 between the upper perforated portion 320 and the lower solid portion 330 of the sidewall 310. The basket baseplate 350 may be oriented horizontally such that a center plane C of the basket baseplate 350 is perpendicular to the +/−Z direction of the coordinate axis in FIG. 3. The basket baseplate 350 may have a bottommost surface 352 and an outer radial edge 356. The basket baseplate 350 may be coupled to the sidewall 310 so that an outer radial edge 356 of the basket baseplate 350 is connected to the inner surface 312 of the sidewall 310.

Figure 4:
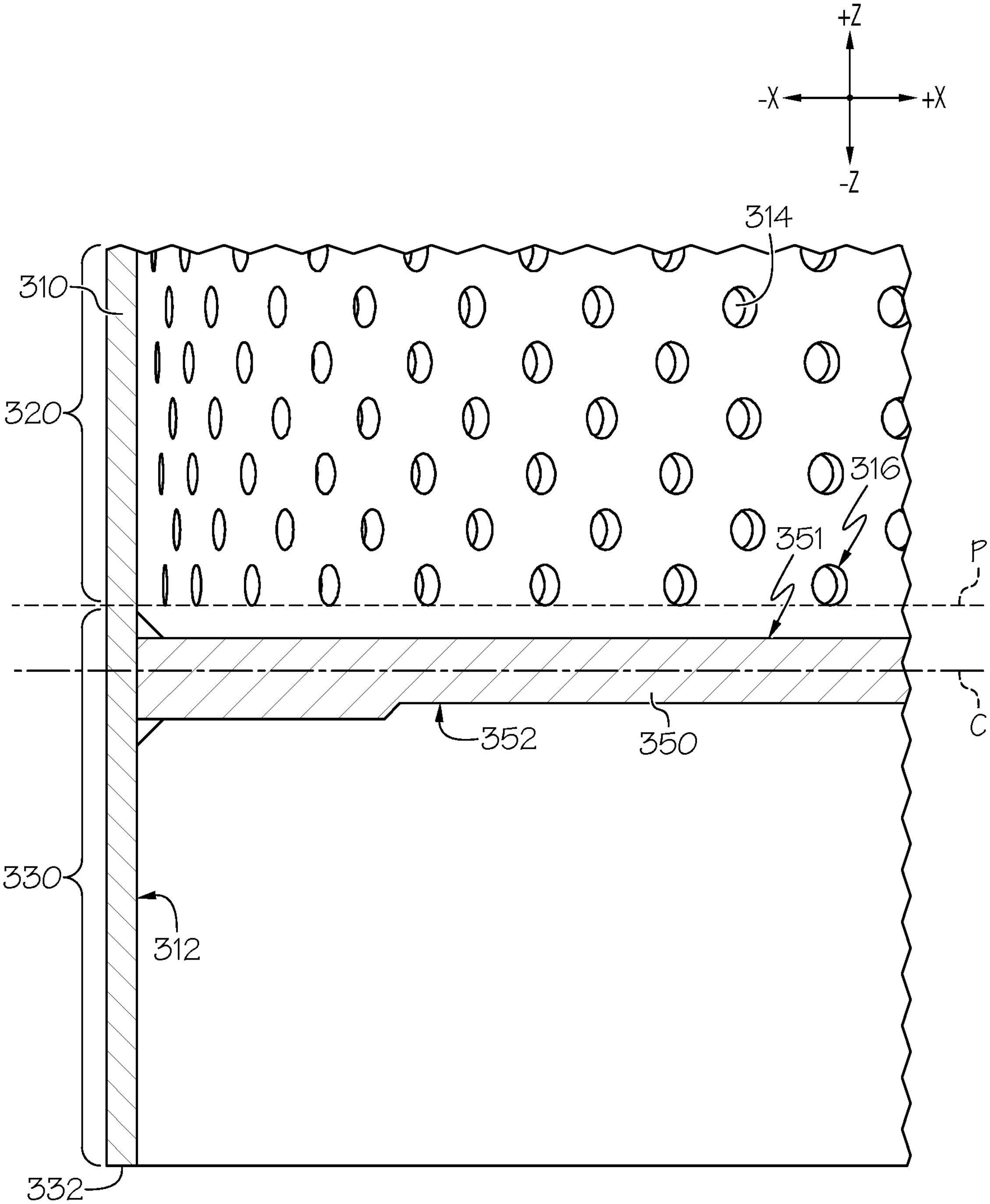
FIG. 4 schematically depicts a cross-sectional view of a section of the centrifuge basket of FIG. 3, according to one or more embodiments shown and described herein.
Figure 5:
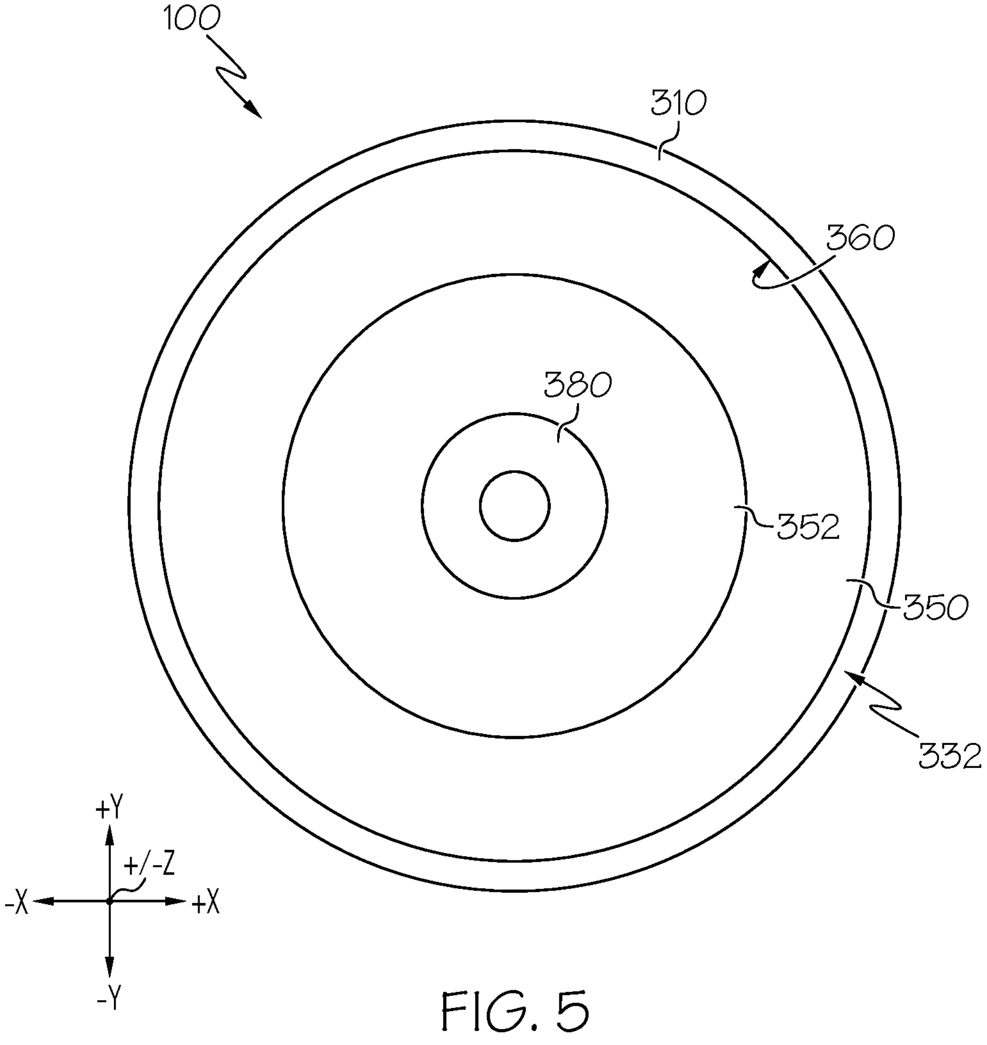
FIG. 5 schematically depicts a bottom view of the centrifuge basket of FIG. 3, according to one or more embodiments shown and described herein.

Referring to FIG. 3, the basket baseplate 350 may be positioned within the cylindrical sidewall 310 between the upper perforated portion 320 and the lower solid portion 330 of the sidewall 310, such as just below the bottom of the upper perforated portion 320 so that no perforations of the sidewall 310 are below the level of the basket baseplate 350. Referring now to FIG. 4, the basket baseplate 350 may be positioned relative to the sidewall 310 so that the center plane C of the basket baseplate 350 is vertically below (e.g., in the −Z direction of the coordinate axis in FIG. 4) the horizontal plane P tangent to a bottom of the perforations 314 the bottom most row 316 of perforations 314. The basket baseplate 350 may be positioned relative to the sidewall 310 so that at least a portion of the lower solid portion 330 of the sidewall 310 extends below the basket baseplate 350. In embodiments, the basket baseplate 350 may be positioned relative to the sidewall 310 so that the center plane C of the basket baseplate 350 is vertically above (e.g., in the +Z direction of the coordinate axis in FIG. 4) the bottommost end 332 of the sidewall 310. In embodiments, the basket baseplate 350 may be positioned relative to the sidewall 310 such that the bottom most surface 352 of the basket baseplate 350 is vertically above (e.g., in the +Z direction of the coordinate axis in FIG. 4) and spaced apart from the bottommost end 332 of the sidewall 310. The lower solid portion 330 of the sidewall 310 extending below the basket baseplate 350 may not include any perforation or holes. Referring now to FIG. 5, the disk-shaped basket baseplate 350 may be coupled/welded to the inner surface 312 of the sidewall 310 along an inner cylinder circumference 360 between the upper perforated portion 320 and the lower solid portion 330 of the sidewall 310.

The basket baseplate 350 may be coupled to the inner surface of the sidewall 310 in a manner that prevents penetration of extraction fluid between the basket baseplate 350 and the inner surface of the sidewall 310. The basket baseplate 350 may be coupled, such as welded, to the sidewall 310 so that the basket baseplate 350 is sealed against the sidewall 310 to prevent liquids or gases from passing through the joint between the basket baseplate 350 and the sidewall 310. The joint coupling the basket baseplate 350 to the sidewall 310 may be air tight in order for the basket baseplate 350 and lower solid portion 330 of the sidewall 310 to form an air bubble without allowing air to escape the bubble or extraction fluid to infiltrate the bubble through the joint.

Referring again to FIG. 3, the basket baseplate 350 may comprise the sealed basket floor of the centrifuge basket 100. The basket baseplate 350 may be a solid circular plate having a topmost surface 351 and the bottommost surface 352. The basket baseplate 350 may have a hole in the center to receive a spindle attachment assembly 380. The sealed spindle attachment assembly 380 may be welded to the basket baseplate 350. In embodiments, the spindle attachment assembly 380 may be disposed in the hole in the basket baseplate 350 and welded or otherwise coupled thereto.

The spindle attachment assembly 380 may include a housing 382 and a solid cover 390. The basket baseplate 350 may have a center opening, and the housing 382 of the spindle attachment assembly 380 may be disposed within the opening and coupled to the basket baseplate 350, as indicated previously herein. In embodiments, the basket baseplate 350 may be welded to the housing 382 of the spindle attachment assembly 380 with one or more welds 370. The spindle attachment assembly 380 may be coupled to the basket baseplate 350 in a manner that prevents penetration of the extraction fluid between the basket baseplate 350 and the spindle attachment assembly 380. The basket baseplate 350 may be coupled, such as welded, to the spindle attachment assembly 380 so that the basket baseplate 350 is sealed against the spindle attachment assembly 380 to prevent liquids or gases from passing through the joint between the basket baseplate 350 and the spindle attachment assembly 380. The joint coupling the basket baseplate 350 to the spindle attachment assembly 380 may be air tight in order for the basket baseplate 350 and lower solid portion 330 of the sidewall 310 to form an air bubble without allowing air to escape the bubble or extraction fluid to infiltrate the bubble through the joint between the basket baseplate 350 and the spindle attachment assembly 380.

Referring again to FIG. 3, in embodiments, a solid cover 390 may be attached to the housing 382 of the spindle attachment assembly 380. The solid cover 390 may seal the rotating spindle 70 (FIGS. 2 and 6) from the extraction fluid in the centrifuge basket 100 during operation of the industrial centrifuge 10. The spindle attachment assembly 380 may be rigidly attached to the motor drive spindle 70.

In one type of chemical extraction centrifuge, the cylindrical centrifuge basket 100 may spin reversibly at rotational speeds of up to approximately 100 rotations per minute (RPM). However, in some embodiments, the industrial centrifuge 10 of the present disclosure may be operated at rotational speeds of greater than 100 RPM.

Figure 6:
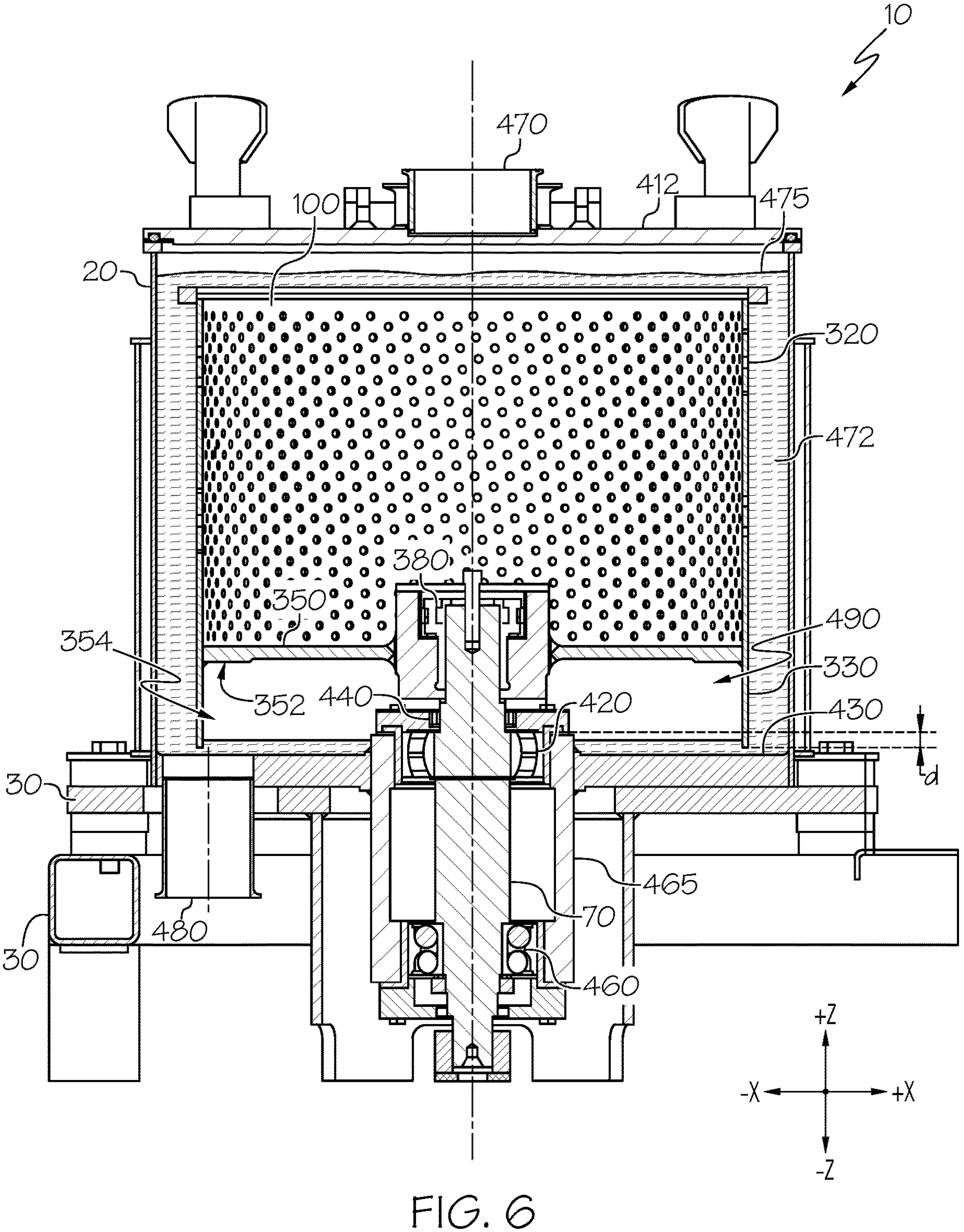
FIG. 6 schematically depicts a cross-sectional view of the industrial centrifuge of FIG. 1 having the basket spindle bearing assembly of FIG. 3 with the air seal for the spindle bearing in operation, according to one or more embodiments shown and described herein.

Referring now to FIG. 6, the centrifuge basket 100 is mounted inside the cylindrical vessel 20 (curb), which is a fluid-tight container. The cylindrical vessel 20, which has an openable sealed top lid 412, may be attached to a curb baseplate 430, which may be further attached to the raised machine floor 30. The curb baseplate 430 may form a bottom of the cylindrical vessel 20.

The rotating spindle 70 may be affixed to the centrifuge basket 100 using the spindle attachment assembly 380. The spindle 70 may pass through the spindle bearing assemblies 420 and 460 mounted in a bearing housing 465, which may be coupled to the curb baseplate 430. The bearing housing 465 may surround the spindle bearing assemblies. The curb baseplate 430 may be attached to the raised machine floor 30. The spindle 70 may pass vertically through the spindle bearing assemblies 420 and 460 and may extend vertically downward (e.g., in the −Z direction of the coordinate axis of FIG. 6) to engage with the drive mechanism disposed vertically below the curb baseplate 430 of the cylindrical vessel 20. As used herein, the term drive mechanism may refer to the electric motor 60 (FIG. 2) or other type of motor and any linkage between the motor 60 and the spindle 70, such as but not limited to the timing belt 80 depicted in FIG. 2.

Referring again to FIG. 6, the industrial centrifuge 10 may include a simple, lip-type contact seal 440 disposed between the bottom of the spindle attachment assembly 380 and the spindle bearing assembly 420. Although a lip-type contact seal 440 is depicted, it is understood that other types of seals, such as face seals for example, may be disposed between the bottom of the spindle attachment assembly 380 and the spindle bearing assembly 420.

The industrial centrifuge 10 may include an inlet pipe 470 and an outlet pipe 480. The inlet pipe 470 for the extraction fluid may enter through the top of the cylindrical vessel 20, such as through the sealed top lid 412. All extraction fluid may be drained out of the curb through the outlet pipe 480. Both the outlet pipe 480 and bearing housing 465 may be attached and sealed to curb baseplate 430 in a manner that prevents leakage of the extraction fluid between the curb baseplate 430 and the bearing housing 465 and outlet pipe 480.

Referring again to FIG. 6, the basket baseplate 350, the lower solid portion 330 of the sidewall 310 extending below basket baseplate 350, and at least a portion of the spindle 70 define a skirted volume 354. In embodiments, the skirted volume 354 may be defined by the basket baseplate 350, the lower solid portion 330 of the sidewall 310 extending below basket baseplate 350, the housing 382 of the spindle attachment assembly 380, the lip-type contact seal 440, and at least a portion of the spindle bearing assembly 420. The skirted volume 354 may be an annular volume defined between an inner surface of the lower solid portion 330 of the sidewall 310 and the spindle 70. In embodiments, the skirted volume 354 may be the annular volume defined between the inner surface 312 of the lower solid portion 330 of the sidewall 310, the outer surfaces of the housing 382 of the spindle attachment assembly 380, the lip-type contact seal 440, the spindle 70, and the spindle bearing assembly 420. The skirted volume 354 may extend downward (i.e., in the −Z direction of the coordinate axis in FIG. 6) from the bottommost surface 352 of the basket baseplate 350 to the bottommost end 332 of the lower solid portion 330 of the sidewall 310.

The skirted volume 354 may be initially filled with air prior to operation of the industrial centrifuge 10 and may enable formation of an air bubble 490 within the skirted volume 354 when the extraction fluid is added to the cylindrical vessel 20 during operation. The air bubble 490 formed in the skirted volume 354 may provide an air seal between the extraction fluid 472 in the cylindrical vessel 20 and the lip-type contact seal 440 disposed between the spindle attachment assembly 380 and the spindle bearing assembly 420. The air seal created by the air bubble 490 may reduce or prevent contact between the extraction fluid 472 and the lip-type contact seal 440, which may reduce or prevent intrusion of the extraction fluid 472 into the spindle bearing assemblies 420, 460.

In embodiments, at least a portion of the spindle bearing assembly 420 may be disposed within the skirted volume 354 such that the portion of the spindle bearing assembly 420 may be contained within the air bubble 490 when the cylindrical vessel 20 is filled with extraction fluid 472. At least a portion of the spindle bearing assembly 420 may be disposed vertically above the bottommost end 332 of the lower solid portion 330 of the sidewall 310. When the cylindrical vessel 20 is filled with extraction fluid 472 to the working level 475, the volume of extraction fluid 472 in the cylindrical vessel 20 may exert hydrostatic pressure forces that may act to compress the air bubble 490 in the skirted volume 354, which may cause the final vertical level of the extraction fluid 472 in the skirted volume 354 to be higher than the bottommost end 332 of the lower solid portion 330 of the sidewall 310. To compensate for this effect, a vertical distance d between a topmost portion of the spindle bearing assembly 420 and the bottommost end 332 of the lower solid portion 330 of the sidewall 310 may be sufficiently large so that the air bubble 490 trapped by the skirted volume 354 contains at least a portion of the spindle bearing assembly 420 when the air bubble 490 is compressed by the extraction fluid 472 when filled to the working level 475 at the operating temperature of the industrial centrifuge 10, such as a temperature of −40° C. In other words, the vertical distance d should be sufficient to allow the air bubble 490 to be compressed by the extraction fluid during filling while still maintaining a portion of the spindle bearing assembly 420 within the air bubble 490. The vertical distance d between the topmost portion of the spindle bearing assembly 420 and the bottommost end 332 of the lower solid portion 330 of the sidewall 310 may depend on the dimensions of the cylindrical vessel 20 (e.g., the height), the total volume defined by the skirted volume 354, the operating temperature of the industrial centrifuge 10, and the properties of the extraction fluid 472.

In embodiments, at least a portion of the bearing housing 465 may be disposed within the skirted volume 354 such that the topmost portion of the bearing housing 465 is contained within the air bubble 490 when the cylindrical vessel 20 is filled with the extraction fluid 472. At least a portion of the bearing housing 465 may be disposed vertically above the bottommost end 332 of the lower solid portion 330 of the sidewall 310. As previously discussed, the extraction fluid 472 may compress the air bubble 490 when the cylindrical vessel 20 is filled to the working level 475. Thus, a vertical distance between a topmost portion of the bearing housing 465 and the bottommost end 332 of the lower solid portion 330 of the sidewall 310 may be sufficiently large so that the air bubble 490 trapped by the skirted volume 354 contains at least a portion of the bearing housing 465 when the air bubble 490 is compressed by the extraction fluid 472 when filled to the working level 475 at the operating temperature of the industrial centrifuge 10, such as a temperature of −40° C. In other words, the vertical distance should be sufficient to allow the air bubble 490 to be compressed by the extraction fluid during filling while still maintaining a portion of the bearing housing 465 within the air bubble 490. The vertical distance between the topmost portion of the bearing housing 465 and the bottommost end 332 of the lower solid portion 330 of the sidewall 310 may depend on the dimensions of the cylindrical vessel 20 (e.g., the height), the total volume defined by the skirted volume 354, the operating temperature of the industrial centrifuge 10, and the properties of the extraction fluid 472

Referring again to FIG. 6, operation of the industrial centrifuge 10 of the present disclosure will now be described. When the cylindrical vessel 20 is empty of extraction fluid 472, then the cylindrical vessel 20 may be temporarily opened by opening the sealed top lid 412, and the biomass (not shown) from which one or more chemicals, such as but not limited to CBD, is to be extracted may then be placed within the centrifuge basket 100 disposed in the cylindrical vessel 20. The sealed top lid 412 may then be closed and sealed. The −40° F. extraction fluid 472, such as but not limited to ethanol, heptane, or other extraction fluids, may be introduced to the cylindrical vessel 20 through inlet pipe 470, filling cylindrical vessel 20 from the curb baseplate 430 up to a typical working level 475 just above the top of the centrifuge basket 100. Although not shown in FIG. 6, the extraction fluid 472 along with the biomass fills the portion of the centrifuge basket 100 defined by the upper perforated portion 320 of the sidewall 310 as well. During filling of the cylindrical vessel 20 with the extraction fluid 472, air may become trapped in the skirted volume 354 by the increasing level of extraction fluid 472. Thus, an air bubble 490 may form in the skirted volume 354 defined underneath the centrifuge basket baseplate 350. This air bubble 490 may be slightly compressed air at the extraction fluid temperature of −40° F. The length and diameter of the lower solid portion 330 of the sidewall 310 of the centrifuge basket 100 may determine the size of the air bubble 490 and the fluid exclusion volume, which is the volume of extraction fluid excluded from the skirted volume 354 by the air bubble 490.

As previously discussed, the rotating spindle attachment assembly 380 may be rigidly attached to the centrifuge basket 100. The spindle bearing assembly 420 may be attached to curb baseplate 430, with a lip type contact seal 440 attached to spindle bearing assembly 420. By design, the gap between the spindle attachment assembly 380 and the spindle bearing assembly 420 may be enclosed in the air bubble 490 defined by the skirted volume 354 so that the lip-type contact seal 440 is positioned near the center of the air bubble 490. Thus, the air bubble 490 may form an air seal including the lip type contact seal 440, which may exclude the extraction fluid 472 from the spindle bearing assembly 420.

Forming an air bubble 490 in the skirted volume 354 defined underneath the centrifuge basket baseplate 350, as shown in FIG. 6, may reduce the total volume of extraction fluid 472 required to fill the cylindrical vessel 20 to the working level 475 by the volume of the air bubble 490. Thus, less volume of extraction fluid 472 may be required for operation of the industrial centrifuge 10.

Many modifications and other embodiments of the present disclosure set forth herein will come to mind to one skilled in the art to which this subject matter pertains, once having the benefit of the teachings in the foregoing descriptions and associated drawings. Therefore, it is understood that the subject matter of the present disclosure is not limited to the specific embodiments disclosed, and that modifications and other embodiments are intended to be included within the scope of the appended claims. Although specific terms are employed herein, they are used in a generic and descriptive sense only and not for purpose of limitation.

What is claimed is:

1. An industrial centrifuge for extracting one or more compounds from biomass, the industrial centrifuge comprising:

a centrifuge basket disposed within a cylindrical vessel, the centrifuge basket comprising:

a sidewall comprising an upper perforated portion and a lower solid portion, where the sidewall is cylindrical;

a basket baseplate coupled to an inner surface of the sidewall between the upper perforated portion and the lower solid portion, where the cylindrical vessel comprises an outlet pipe disposed vertically below a bottommost end of the lower solid portion of the basket baseplate; and a spindle coupled to the basket baseplate and operatively coupled to a drive mechanism operable to rotate the spindle about an axis;

a spindle bearing assembly coupled to the cylindrical vessel and disposed between a bottom of the cylindrical vessel and the basket baseplate; and a contact seal disposed between the spindle bearing assembly and the basket baseplate;

wherein:

the spindle passes vertically through the spindle bearing assembly and extends vertically downward to the drive mechanism disposed vertically below the bottom of the cylindrical vessel;

the lower solid portion of the sidewall, a portion of the spindle, and the basket baseplate define a skirted volume;

at least a portion of the spindle bearing assembly is disposed within the skirted volume; and during operation of the industrial centrifuge, air trapped within the skirted volume provides an air seal between an extraction fluid in the cylindrical vessel and the contact seal.

2. The industrial centrifuge of claim 1, wherein a center plane of the basket baseplate is disposed vertically below a horizontal plane P tangent to a bottom of perforations in a bottommost row of perforations of the upper perforated portion of the sidewall.

3. The industrial centrifuge of claim 1, wherein the basket baseplate is sealed against the sidewall to prevent liquids or gases from passing through the joint between the basket baseplate and the sidewall.

4. The industrial centrifuge of claim 1, further comprising a spindle attachment assembly coupled to the basket baseplate, wherein:

the spindle attachment assembly couples the spindle to the basket baseplate; and the skirted volume comprises an annular volume defined by the lower solid portion of the sidewall, the basket baseplate, a housing of the spindle attachment assembly, the portion of the spindle, and the portion of the spindle bearing assembly.

5. The industrial centrifuge of claim 4, wherein the spindle attachment assembly is coupled to a bottommost surface of the basket baseplate.

6. The industrial centrifuge of claim 4, wherein the basket baseplate is sealed against the spindle attachment assembly to prevent liquids or gases from passing through the joint between the basket baseplate and the spindle attachment assembly.

7. The industrial centrifuge of claim 1, wherein at least a portion of the spindle bearing assembly is disposed vertically above a bottommost end of the lower solid portion of the sidewall.

8. The industrial centrifuge of claim 1, wherein a vertical distance between the bottommost end of the lower solid portion of the sidewall and a point on the bottommost surface of the basket baseplate is greater than a shortest vertical distance between the spindle bearing assembly and the point on the bottommost surface of the basket baseplate.

9. The industrial centrifuge of claim 1, wherein the spindle bearing assembly is mounted in a bearing housing that surrounds the spindle bearing assembly.

10. The industrial centrifuge of claim 9, wherein at least a portion of the bearing housing is disposed within the skirted volume.

11. The industrial centrifuge of claim 9, wherein a bottommost end of the lower solid portion of the sidewall is disposed vertically below at least a portion of the bearing housing.

12. The industrial centrifuge of claim 9, wherein the basket baseplate does not have perforations or openings that allow gases or fluids to flow between the bottommost surface of the basket baseplate and the topmost surface of the basket baseplate.

13. The industrial centrifuge of claim 1, wherein the lower solid portion of the sidewall of the centrifuge basket does not have perforations or openings.

14. The industrial centrifuge of claim 1, wherein the basket baseplate is a solid disk-shaped plate.

15. The industrial centrifuge of claim 1, wherein the contact seal is a lip-type contact seal.

* * * * *